United States Patent [19]

Arai et al.

[11] Patent Number: 4,667,099

[45] Date of Patent: May 19, 1987

[54] OPTICAL LINEAR ENCODER

[75] Inventors: Noboru Arai; Hidetoshi Shinada, both of Ashigara-Kami, Japan

[73] Assignee: Fuji Photo Film Co., Ltd., Kanagawa, Japan

[21] Appl. No.: 789,247

[22] Filed: Oct. 18, 1985

[30] Foreign Application Priority Data

Oct. 19, 1984 [JP] Japan ................... 59-218291

[51] Int. Cl.$^4$ ............................................. H01J 3/14
[52] U.S. Cl. .................................... 250/235; 358/293
[58] Field of Search .......................... 250/235, 237 G; 358/293

[56] References Cited

U.S. PATENT DOCUMENTS 4,578,577 3/1986 Noguchi .................... 250/235
4,587,420 5/1986 Noguchi et al. .............. 250/235
4,600,837 7/1986 DiStefano et al. ............ 250/235

Primary Examiner—Eugene R. LaRoche
Assistant Examiner—David Mis
Attorney, Agent, or Firm—Sughrue, Mion, Zinn, Macpeak and Seas

[57] ABSTRACT

An optical linear encoder for converting scanning light beams incident thereupon into a series of pulsatory light comprising light transmission parts for passing through the scanning light beams and light non-transmission parts for blocking transmission of the scanning light beams. The light non-transmission parts are alternately arranged with said light transmission parts in predetermined intervals that are determined by the amount of distortion inherently occurring in an optical system through which the scanning light beams travel.

9 Claims, 12 Drawing Figures

FIG_1
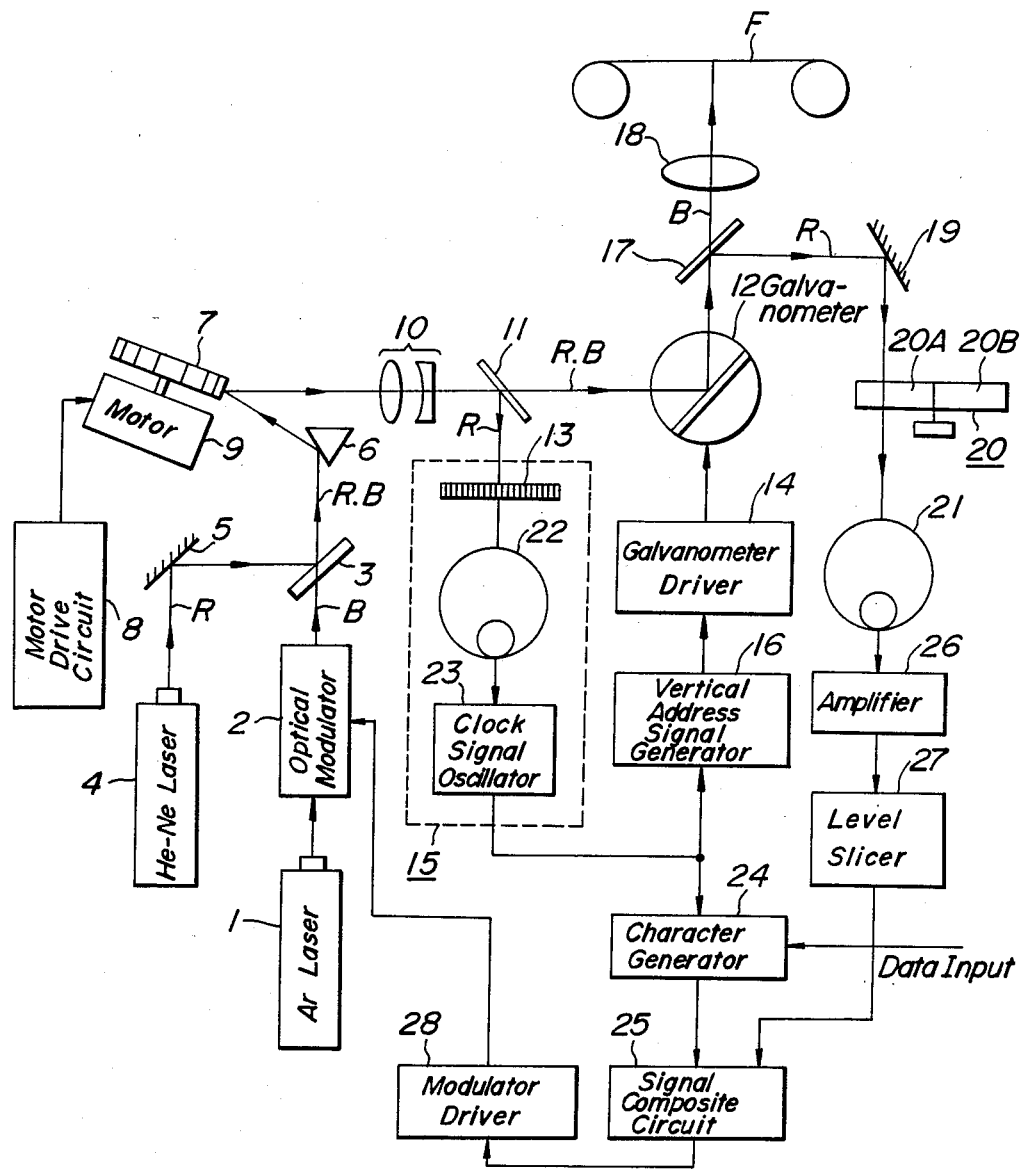

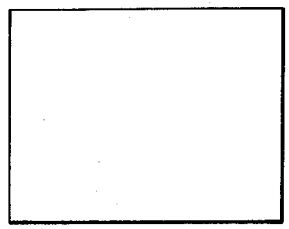
FIG_2A
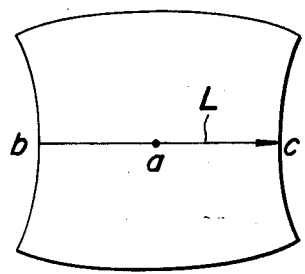
FIG_2B

FIG.3A
PRIOR ART
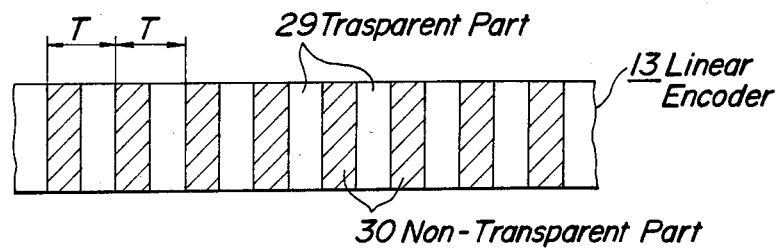
FIG.3B
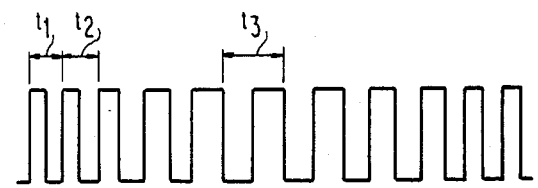
FIG.3C
AAAAAAA

FIG. 4A
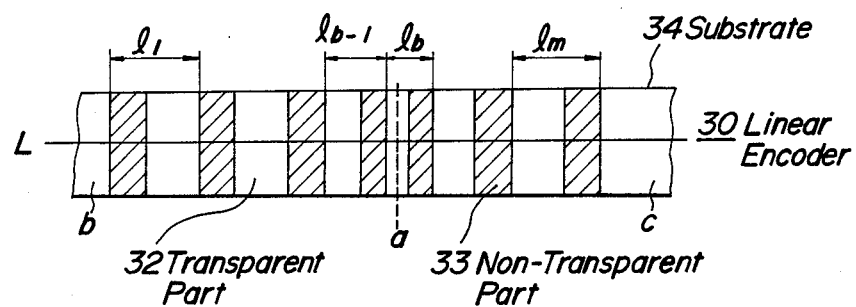
FIG. 4B
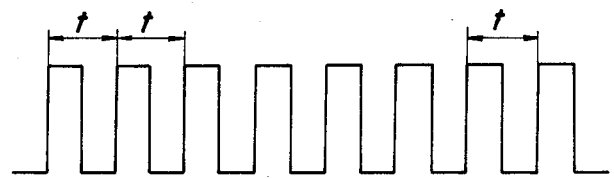
FIG. 4C
AAAAAA

OPTICAL LINEAR ENCODER

BACKGROUND OF THE INVENTION

1. Field of the Invention

The present invention generally relates to an optical linear encoder, and, more particularly, to an optical linear encoder that is suitable for a clock signal generator employed in an information recording apparatus where a light beam intensity-modulated with information signals is deflected in an optical scanning system, and then a photo-sensitive recording medium is raster-scanned by the modulated light beam in the recording period.

2. Description of Prior Art

Various optical scanning types of information recording apparatus have been developed in which information is recorded under the control of clock signals produced by optically scanning an optical linear encoder.

As such an information recording apparatus, a computer output microfilm apparatus (referred to as "laser-COM" hereinafter) is known, in which print data (variable information) supplied from the computer and desirable form data (fixed information) are recorded on microforms by employing a laser beam as scanning light.

An optical scanning system of the above-described laser-COM will now be summarized with reference to FIG. 1.

An argon (Ar) laser 1 emits blue green light beams for recording purposes, which are indicated by "B". The blue green light beams B are intensity-modulated in an optical modulator 2 by video signals (will be discussed later) and thereafter pass through a first dichroic mirror 3. A helium-neon (He - Ne) laser 4 emits red light beams for reading purposes, which are denoted by "R". The red light beams R are incident upon a first reflecting mirror 5 and reflected therein and thereafter incident on the first dichroic mirror 3. The red light beams R are reflected on the first dichroic mirror 3 and mixed with the other light beams for recording purposes that have passed through this dichroic mirror 3. The combined light beams are incident on a rotating polyhedric mirror 7 through a second reflecting mirror 6. In this case, the first dichroic mirror 3 is designed to pass the blue and green light beams therethrough and to reflect the red light beams thereon.

The rotating polyhedric mirror 7 is rotated in a predetermined direction at a constant rate by a motor 9 to which a power is supplied from a motor drive circuit 8. As a result, the combined light beams R, B incident upon the respective mirror surface of the rotating polyhedric mirror 7 are reflected on these mirror surfaces and simultaneously deflected (referred to as "horizontal-deflected beams"). Then, the mixed light beams are converted into primary scanning light having a repetition period that is defined by the beam reflections occur in the respective mirror surfaces of the rotating polyhedric mirror 7. The primary scanning light is incident upon a second dichroic mirror 11 via a convergent optical system 10. The second dichroic mirror has such characteristics that the recording blue-green light beams and the reading red light beams can be transmitted there-through and a part of the reading red light beams can be reflected thereon. Accordingly, in the mixed light beams incident upon the second dichroic mirror 11, both the blue-green light beams B and the red light beams R pass toward a galvanometer 12, and the red light beams R are partially reflected and incident upon a linear encoder 13.

In response to saw-tooth driving signals supplied from a galvanometer driver 14, the galvanometer 12 deflects the recording light beams R, B in a direction substantially perpendicular to the horizontal deflecting direction (referred to as "vertical deflection"). As described above, the galvanometer driver 14 produces the saw-tooth driving signals based upon clock signals derived from a clock signal generator 15 (will be discussed later). For instance, counting these clock signals in a vertical address signal generator 16 in the vertical deflection period enables the vertical address signals to be produced. In response to these address signals, the galvanometer driver 14 produces the above-described saw-tooth driving signals.

Since the blue green light beams and also the red light beams vertically deflected by the galvanometer 12 have been converted into the one dimensional scanning light by the rotating polyhedric mirror 7, they become two dimensional scanning light by means of such vertical deflections. Then, the two dimensional scanning light is incident upon a third dichroic mirror 17, thereby splitting it into the blue green light and the red light.

The two dimensional scanning light of the blue green light beams passing through the third dichroic mirror 17 is focused on recording materials such as films via a focusing optical system 18 to raster-scan them. The other two dimensional scanning light of the red light beams split by the third dichroic mirror 17 is incident upon a form slide film 20A via a third reflecting mirror 19.

In a form slide film device 20, a plurality of form slide films 20A 20B, ---, 20N (where N represents the number of slides) are preset which are the most useable. Different slide images and writing frames constituted by a plurality of vertical and horizontal lines are recorded on these slide films 20A, 20B, --- , 20N. For the sake of simplicity, only two form slide films 20A and 20B are illustrated. One of these form slide films is selectively moved to a scanning position where it is scanned by the above two dimensional scanning light. As desired, the form slide films 20A, 20B, --- , 20N are arbitrarily detachable from the form slide device 20.

As seen from FIG. 1, the two dimensional scanning light R passes through the form slide film 20A and is converted in a first photomultiplier 21 to electric readout signals. The readout signals correspond to video signals of the writing frame image of the scanned form slide film 20A.

The red light beams R split by the second dichroic mirror 11 are, on the other hand, incident upon a linear encoder 13 to be one-dimensional-scanned. The linear encoder 13 is formed by a plurality of transparent and non-transparent line-shaped grids which are aligned parallel to the horizontal deflection direction and equidistantly separated to form a straight striped pattern. Pulsatory light obtained by scanning this linear encoder 13 by means of the horizontal deflection scanning light is converted by a second photomultiplier 22 into pulse signals as clock pulse signals. By applying these clock pulse signals to a phase-coupling type clock signal oscillator 23, clock signals are oscillated. The clock signals are used to synchronize the respective circuit elements of the laser-COM with each other under the desirable timings. The linear encoder 13, second photomultiplier 22, and clock signal oscillator 23 constitute a clock signal generating device 15.

Under the timing control of the clock signals derived from the clock signal generating device 15, character information corresponding to coded data from the character information source such as magnetic tapes etc. can be read out from a character generator 24 as video signals. These video signals derived from the character generator 24 are supplied to a signal composite circuit 25. While the form signals that are obtained by amplifying outputs of the first photomultiplier 21 in the amplifier 26 and thereafter shaping them in a level slicer 27 are supplied to the signal composite circuit 25, the above video signals are combined with the form signals in the signal composite circuit 25.

Thus the composite video signals are supplied through a modulator drive circuit 28 to the optical modulator 2 so as to intensity-modulate the recording light beams. As easily seen, the raster-scanned image projected toward the film F corresponds to an image formed due to the fact that the print data derived from the computer is written in a given position of the form frame selected by the form slide film.

As previously described in detail, the linear encoder 13 of the clock signal generating device 15 is constituted by the line-shaped grids equidistantly arranged as a striped pattern. Accordingly, if the deflection speed, or rate of the scanning light for this linear encoder 13 is constant, time periods of the pulsatory light incident upon the second photomultiplier 22 would become equal since the line-shaped grids are scanned by the scanning light beams having a constant deflection speed. In this case, the correct clock signals having no frequency variation can be produced from the clock signal generating device 15.

However, the scanning light incident upon the linear encoder 13 is traveled through a plurality of optical elements prior to being incident upon the linear encoder 13. As a result, it is considerably influenced by distortion of these optical elements, especially the focusing optical system (lens system) 10. When the rectangular image as shown in FIG. 2A is for instance transported through the optical system having such distortions, the transported image becomes optically distorted as shown in FIG. 2B. Thus, the scanning speed of the horizontal scanning light incident upon the linear encoder 13 via such an optical system is not constant, or varied, so that the linearity of the pulsatory light derived from the linear encoder 13 is hampered. The scanning light "L" intersecting the optical system having the distortion shown in FIG. 2B is conducted to the linear encoder 13. In this circumstance, the scanning speed of the scanning light beams, at the center a of the distorted image, incident upon the linear encoder 13 through the above-described distorted optical system is different from that of the scanning light beams at the ends b and c thereof. Accordingly the outputs of the linear encoder 13 contain the deflection distortion. The conventional linear encoder 13 shown in FIG. 3A in which the light transmission parts 29 and the light non-transmission parts 30 are equidistantly arranged delivers the pulsatory light of which occurence periods are not uniform. An interval between these light transmission parts 29 or non-transmission parts 30 is indicated by "T". The pulse signals derived from the second photomultiplier 22 to which such a pulsatory light is conducted contain non-uniform time periods such as signal intervals $t_1$, $t_2$, $t_3$ and so on (see FIG. 3B). Consequently frequencies of the clock signals derived from the clock signal generating device 15 in synchronism with these pulse signals are changed in the deflection periods of the scanning light beams, so that as illustrated in FIG. 3C, the recorded image of the data (varied information) read out from the character generator 24 shown in FIG. 1 is considerably distorted on the film F.

An object of the present invention is to provide an optical linear encoder in which scanning light beams conducted into the clock signal generating device through the optical system having optical distortions are converted into a series of pulsatory light equivalent to the distortion-corrected scanning light so as to solve the conventional drawback occurring in the clock signal generating device.

SUMMARY OF THE INVENTION

The objects of the invention may be accomplished by providing an optical linear encoder for converting scanning light beams incident thereupon into a series of pulsatory light comprising:

light transmission parts for passing through the scanning light beams; and light non-transmission parts for blocking transmission of the scanning light beams, said light non-transmission parts being alternately arranged with said light transmission parts in predetermined intervals that are determined by an amount of distortion inherently occurring in an optical system through which the scanning light beams travel.

BRIEF DESCRIPTION OF THE DRAWINGS

For a better understanding of these objects and features of the present invention, reference is made to the following detailed description of the invention to be read in conjunction with the following drawings, in which:

FIG. 1 is an entire block diagram of a computer output microfilm apparatus employing the conventional optical linear encoder;

FIGS. 2A and 2B are illustrations of optical distortions;

FIGS. 3A to 3C show the conventional linear encoder and the output pulse signal;

FIGS. 4A to 4C show a linear encoder and output pulse signal according to a first embodiment;

DETAILED DESCRIPTION OF PREFERRED EMBODIMENTS

Figure 5:
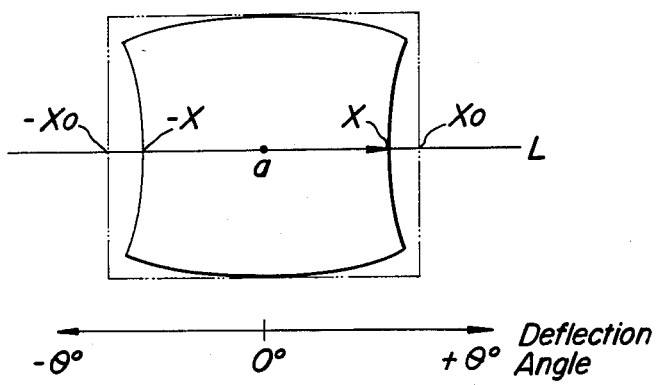
FIG. 5 illustrates how to calculate amounts of distortions.

Referring to FIG. 4A, an optical linear encoder 30 according to one preferred embodiment of the invention will now be described. The optical linear encoder 30 is suitable to be employed in the laser-COM shown in FIG. 1 in place of the conventional optical linear encoder 13. That is, the optical linear encoder 30 can compensate for the scanning light beams "L", which have traveled through the distorted optical system, e.g., the focusing lens system 10, whose scanning speed, or rate is non-linear-distorted.

As seen from FIG. 4A, the striped pattern of the linear encoder 30 is constituted by light transmission parts 32 and light non-transmission parts 33 in parallel thereto. The alternating arrangement of these light transmission parts 32 and light non-transmission parts 33 is similar to that of the conventional linear encoder 13. However, the stripe intervals of the adjoining line-shaped grid (i.e., the light transmission parts 32 and the light non-transmission parts 33) are completely different from the conventional linear encoder 13 in which the stripes have equal pitch. As seen from FIG. 4A, the intervals $l_1$, --- $l_{b-1}$, $l_b$, --- $l_m$ between the light transmission parts 32 and the light non-transmission parts 33 are divergent from each other. The intervals $l_{b-1}$, $l_b$ adjacent to the center region a of the linear encoder 30 are gradually, symmetrically shorter than the intervals $l_1$, $l_m$ near the end regions b, c thereof.

The arrangement of the light transmission parts 32, or the light non-transmission parts 33 is symmetrically formed with respect to the center region of the linear encoder 30. The intervals $l_1$ --- $l_{b-1}$, $l_b$ --- , $l_m$ along the deflection direction of the scanning beam "L" are designed by the following formula:

$$l_1 > \cdots > l_b < l_{b-1} \cdots < l_m \quad (1)$$

That is to say, the relative velocity between the scanning speeds at the higher scanning rate regions b and c, and at the lower scanning rate region a is selected to be equal. Accordingly both the right and left end regions b and c must be scanned at the higher scanning speed, while the center region a must be scanned at the lower scanning speed.

Then, when the linear encoder 30 is scanned by the reading red light beams in the laser-COM having optical distortion shown in FIG. 2B, the pulsatory light produced has an equal time interval. The pulse signals derived from the second photomultiplier 22 are shown in FIG. 4B, the time period "t" of each pulse is equal to every other pulse. As the linear encoder 30 is employed in the pulse signal generator 15 instead of the conventional linear encoder 13, whereby the inherent optical distortion can be optically corrected by the linear encoder 30, the clock signals having the equal period "t" can be correctly produced as shown in FIG. 4B, and thus the correct data image can be conducted to the film F without any deflection distortion (see FIG. 4C).

The stripe of the linear encoder 30 may be arbitrarily fabricated, provided that the intensities of the transmitted light and the non-transmitted light are obtained in a stripe form. For instance, the stripe of the linear encoder 30 may be manufactured in the following method. A thin film is formed on a transparent substrate 34 by means of the vapor deposition. Otherwise it is formed by means of the photo-etching method. Thereafter, portions for the light transmission parts are removed. Many other possibilities may be employed.

Generally, the amount of the deflection distortions of the scanning light can be determined by the amount of the lens distortion. Consequently, if the amount of the lens distortion can be calculated, the above-described formula (1) can be mathematically expressed.

Referring now to FIG. 5, the amount of the lens distortion is described in detail. If there is no distortion in the optical system, a distance Xo from the center a in a plane perpendicular to the optical axis of the lens is expressed as follows:

$$Xo = f \cdot \theta \quad (2)$$

where "f" is a focal distance of the lens and "$\theta$" is a deflection angle (see rectangular shape).

If there is distortion in the optical system, a distance X from the center a is expressed as follows:

$$X = f \tan \theta \quad (3)$$

As a result, the amount of the distortion $\Delta X$ is expressed:

$$\Delta X = \frac{Xo - X}{Xo} \times 100(\%) \quad (4)$$

In the first embodiment, the focal distance "f" is selected to be 60 mm and the deflection angle "$\theta$" is selected to be $\pm 10°$.

Accordingly, the amount of the distortion $\Delta X$ is equal to $-1\%$ under the first embodiment.

The experiment has been made in the following conditions.

When there is no optical distortion, the linear encoder was designed as follows.

| A length of the linear encoder | 27.5 mm |
| The number of the stripes | 320 lines |
| The stripe pitch | 85.8 μm equally |

To the contrary, when the optical distortion existed, the linear encoder according to the invention was designed as follows.

| A length of the linear encoder | 27.5 mm |
| The number of the stripes | 320 lines |
| The stripe intervals | |
| at the center region | 84.8 μm |
| at the end region | 86.8 μm |

The scanning rate is varied from 125 μs and gradually increased toward the end region (at the duty of 67%).

Figure 6:
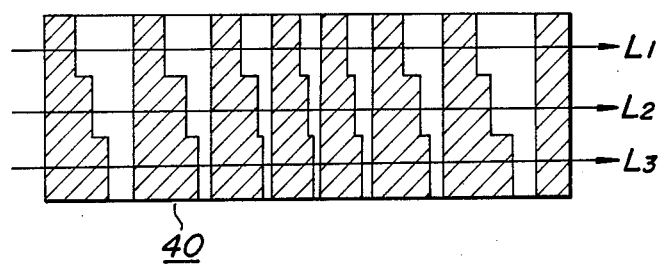
FIG. 6 shows another linear encoder according to a second embodiment.

Referring to FIG. 6, another liner encoder 40 according to the invention is fabricated in a step stripe form. The step stripe of the linear encoder 40 can be scanned in different levels by the various scanning lines $L_1$, $L_2$ and $L_3$ etc. As a result, the frequencies of the clock signals produced from the clock signal generating device 15 employing this linear encoder 40 can be stepwise changed. Also, the pulse numbers of the clock signals can be changed.

Figure 7:
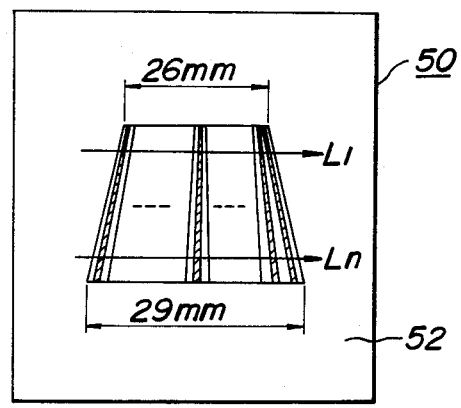
FIG. 7 shows still another linear encoder according to a third embodiment.

Referring to FIG. 7, a linear encoder 50 according to a third embodiment will now be described. The entire shape of this linear encoder 50 is a trapezoid formed on a glass substrate 52. The number of the light transmission parts as shown in white is selected to be 320. The center interval is 84.8 μm and the peripheral interval is 86.8 μm. The scanning speed is set to be 125 μs at the duty of 67%. By continuously scanning this trapezoid from the first line $L_1$ the last line $L_n$, the time periods of the clock signals can be linearly changed.

Instead of the trapezoid linear encoder 50, a fan-shaped linear encoder may be realized according to the invention.

Further, it is evident to those skilled in the art that other modifications can be easily conceived without departing from the technical spirit and scope of the present invention. For instance, any linear encoder may be utilized if the intervals of the pulsatory light incident upon the photomultiplier are controlled to be equal to each other in accordance with the non-linear characteristics of the optical system.

According to the invention, the advantage is that the non-linear distortions of the scanning light beams due to the optical system of the information recording apparatus can be precisely corrected.

As a result, when the linear encoder according to the present invention is employed in the clock signal generating device of the information recording apparatus as shown in FIG. 1, the scanning light beams incident on the photomultiplier can be converted into a series of the pulsatory light having excellent linear time intervals even if the distortion is present in the focusing lens system. Therefore, the relatively low-cost lens system can be employed, so that since it is very difficult to manufacture a lens having no distortion, the total cost the lens system can be considerably reduced.

Moreover, it is known that the optical characteristics of the lenses manufactured in the same production lot can be equally regarded, the same striped pattern of the linear encoder according to the present invention can be employed in the clock signal generating devices manufactured in the same production lot. Accordingly, since such a linear encoder may be mass-produced, a cost reduction can be expected.

What is claimed is:

1. An optical linear encoder (30) for converting scanning light beams (R) incident thereupon into a series of pulsatory light comprising:

light transmission parts (32) for permitting transmission of the scanning light beams therethrough; and
    light non-transmission parts (33) for blocking transmission of the scanning light beams, said light non-transmission parts being alternately arranged with said light transmission parts, wherein each of said light transmission parts and each of said light non-transmission parts are disposed at predetermined varying intervals along a scanning direction, said varying intervals being determined by distortion inherently occurring in an optical system (10) through which the scanning light beams travel.

2. An optical linear encoder as claimed in claim 1, wherein the optical system is constituted by at least a plurality of lenses, and said distortion ($\Delta X$) is expressed by:

$$\Delta X = \frac{Xo - X}{Xo} \times 100\%$$

$$Xo = f \cdot \theta, \text{ and } X = f \tan \theta$$

where Xo and X are a distance from a center in a plane perpendicular to an optical axis of the lens in the cases of no distortion and distortion in the optical system respectively, f is a focal distance of the lens, and $\theta$ is a deflection angle of the scanning light beams.

3. An optical linear encoder as claimed in claim 2, wherein the intervals between the adjoining light transmission part and the light non-transmission part near a central region of the linear encoder are substantially symmetrically increased toward first and second end regions of said linear encoder along the scanning direction of the scanning light beams.

4. An optical linear encoder as claimed in claim 3, wherein both the light transmission and non-transmission parts are formed in a straight striped pattern.

5. An optical linear encoder as claimed in claim 3, wherein both the light transmission and non-transmission parts are formed in a stepwise changed pattern.

6. An optical linear encoder as claimed in claim 3, wherein both the light transmission and non-transmission parts are formed in a trapezoidal pattern.

7. An optical linear encoder as claimed in claim 3, wherein a length of the linear encoder is 27.5 mm, the interval near the central region of the linear encoder is 84.8 μm, and the interval at each of the first and second end regions of said linear encoder is 86.8 μm.

8. An optical linear encoder (30) for converting scanning light beams (R) incident thereupon into a series of pulsatory light, said linear encoder comprising:

light transmission parts (32) for permitting transmission of the scanning light beams therethrough, each of said light transmission parts having a light transmission width in a scanning direction; and
    light non-transmission parts (33) for blocking transmission of the scanning light beams, each of said light non-transmission parts having a light non-transmission width in the scanning direction, wherein said light transmission and non-transmission parts are alternately arranged, and the light transmission width of said light transmission parts and the light non-transmission width of said light non-transmission parts increase in a predetermined pattern from a central portion toward first and second end portions of the linear encoder with respect to the scanning direction, the predetermined pattern being dependent on distortion inherently occurring in an optical system (10) through which the scanning light beams travel, whereby electrical pulses which can be derived from the series of pulsatory light obtained are uniform.

9. An optical linear encoder (30) for converting scanning light beams (R) incident thereupon into a series of pulsatory light, said linear encoder comprising:

light transmission parts (32) for permitting transmission of the scanning light beams therethrough, each of said light transmission parts having a light transmission width in a scanning direction; and
    light non-transmission parts (33) for blocking transmission of the scanning light beams, each of said light non-transmission parts having a light non-transmission width in the scanning direction, wherein said light transmission and non-transmission parts are alternately arranged, wherein the width of said light transmission parts and the width of said light non-transmission parts vary in a predetermined pattern which is dependent on distortion inherently occurring in an optical system (10) through which the scanning light beams travel, the widths of the light transmission and non-transmission parts being greater in areas where the distortion causes the scanning light beams to scan faster than areas where the distortion causes the scanning light beams to scan slower, whereby electrical pulses of uniform duration can be derived from the series of pulsatory light obtained.

* * * * *

UNITED STATES PATENT AND TRADEMARK OFFICE
CERTIFICATE OF CORRECTION

PATENT NO. : 4,667,099

DATED : May 19, 1987

INVENTOR(S) : ARAI ET AL

It is certified that error appears in the above-identified patent and that said Letters Patent is hereby corrected as shown below:   On The Title Page:

In Title of Abstract, delete "ABSTRACT" and insert --ABSTRACT OF THE DISCLOSURE--.

Column 2, line 34, after "20A" insert --,--.

Column 3, line 60, delete "occurence" and insert --occurrence--.

Column 6, line 56, after "$L_1$" insert --to--.

Signed and Sealed this

Eighth Day of November, 1988

Attest:

DONALD J. QUIGG

*Attesting Officer*    *Commissioner of Patents and Trademarks*